June 20, 1967   M. B. HALPENNY   3,326,002
EQUALIZING ROLLER PATHS FOR LOAD BEARING ROLLERS
Filed May 17, 1965   3 Sheets-Sheet 1
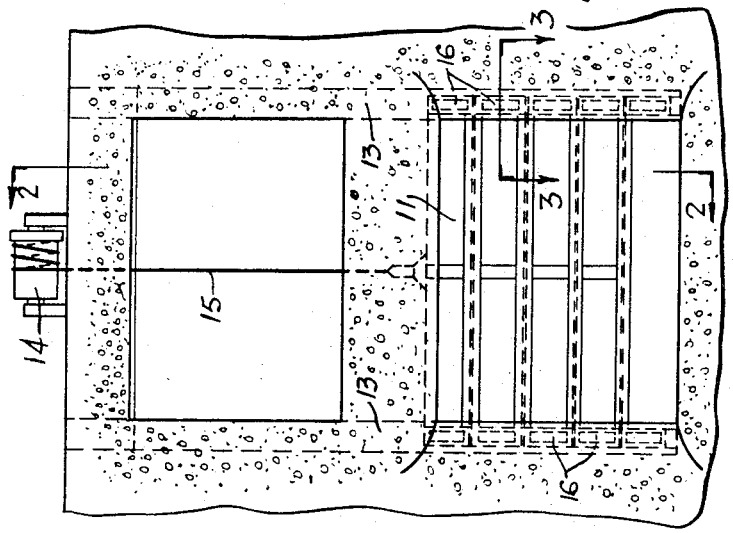
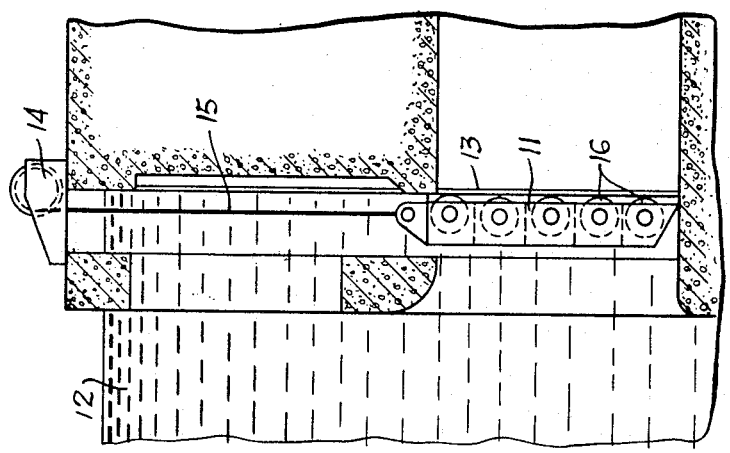
INVENTOR
M. B. HALPENNY
ATTORNEYS June 20, 1967  M. B. HALPENNY  3,326,002
EQUALIZING ROLLER PATHS FOR LOAD BEARING ROLLERS
Filed May 17, 1965  3 Sheets-Sheet 2

INVENTOR
M. B. HALPENNY
ATTORNEYS 3,326,002
EQUALIZING ROLLER PATHS FOR LOAD
BEARING ROLLERS
Merle B. Halpenny, Lachine, Quebec, Canada, assignor to Dominion Bridge Company Limited, Montreal, Quebec, Canada
Filed May 17, 1965, Ser. No. 456,177
9 Claims. (Cl. 61—28)

This invention relates to hydraulic gate structures for controlling water at hydro-electric dams, supply reservoirs, conduits or like installations and, more particularly, to equalizing roller paths for load bearing gate movement roller systems.

In a conventional hydraulic gate structure the horizontal water load on the gate is distributed into the static concrete structure by load bearing rollers which are carried by the vertical end members of the gate and run in metal tracks, embedded in the concrete structure, for opening and closing movements of the gate. Each roller mounting shaft is usually rigidly attached to the gate structure and is, therefore, directly influenced by the flexural behavior of the horizontally loaded gate. In many cases the roller treads are formed to a large radius, conventionally referred to as a crown, to compensate for the effects of structural deflection. The load is thus distributed to an ample width of flat-faced roller path, or rail, by the crowned tread of each roller which theoretically assumes a plane of alignment at right angles to the end slope of the deflected gate structure. In other executions similar results are obtained using rollers with flat-faced treads and a crowned path or rail head. The crown, whether placed on the roller tread or the path, prevents the area of contact loading between roller and path from being wholly concentrated at the edge of the tread, as would be the case if the contact faces on both roller tread and path were made flat. The crowned face method can produce the desired effect at relatively low cost. However, the load bearing capacity of the crown is well below that which is obtainable for a given size of roller utilizing full "flat-faced" contact with the path or rail.

An analysis of installations will show that there has been a tendency in recent years to employ higher head waters and to increase the width of gate openings. In many cases the ratio, horizontal water load over height of gate opening, exceeds the normal limits of design for a crowned contact roller system despite constant improvements in materials. Designers are continually confronted with the problem of physically accommodating a required number of large diameter crowned rollers within the available space. Several methods have been used to adapt maximum capacity, flat-faced contact, roller assemblies with an incorporated system of compensation for gate structure deflection at some point other than the tread contact area. In some cases, flat-faced rollers are mounted in trucks flexibly attached to the gate structure; in other cases, spherical bearings are placed in the roller hubs. Both methods have inherent disadvantages, including high installation and service costs, and also the roller mechanism is additionally complicated by the inclusion of either method.

It is, therefore, the object of this invention to utilize the maximum available load bearing capacity of a roller of given diameter, tread width, and material, and to compensate the entire assembly for the effects of structural deflection.

The widest application of this invention is in connection with hydraulic gates, but it will be understood that the basic principle of this invention may be incorporated into any item of heavily loaded equipment which is required to move in a straight line and to distribute the resulting loads into a static supporting structure.

The basic principle of this invention lies in placing compensating intermediate members between the roller treads of each end roller assembly and the track bearing face of the static foundation structure in such a manner as to permit angular displacement of the roller paths; and including the use of elastomers inserted at the edges of the intermediate members and also at each restraining bolt for the purpose of excluding foreign material and dampening out vibration.

The main advantages of the construction according to this invention are as follows:

The horizontal water load imposed on the hydraulic gate structure is distributed to the static foundation by flat-faced contact roller assemblies which are carried by the gate structure and supported by the static foundation structure in a manner providing full compensation for the effects of gate structure deflection. This enables the designer to make full use of the maximum load bearing capacity of rollers of a given diameter. The arrangement also permits the use of conventional and relatively inexpensive roller hub bearings and does not require roller trucks or other complicated deflection compensating arrangements.

The roller path is a simple intermediate member which is relatively small and may, therefore, be made of expensive material, such as stainless or especially hard steel, without excessive cost. The ease with which the roller path may be replaced is a further advantage. If desirable, to compensate for expected deflections, or for any other reason, a deliberate cant may be introduced into the roller path during assembly.

Further objects and advantages of this invention will be apparent by referring to the following detailed specification and figures, in which:

FIGURE 1 is a front downstream view of a typical hydraulic gate structure which embodies the improved features according to this invention.

FIGURE 2 is a vertical section on 2—2 in FIGURE 1.

Figure 3:
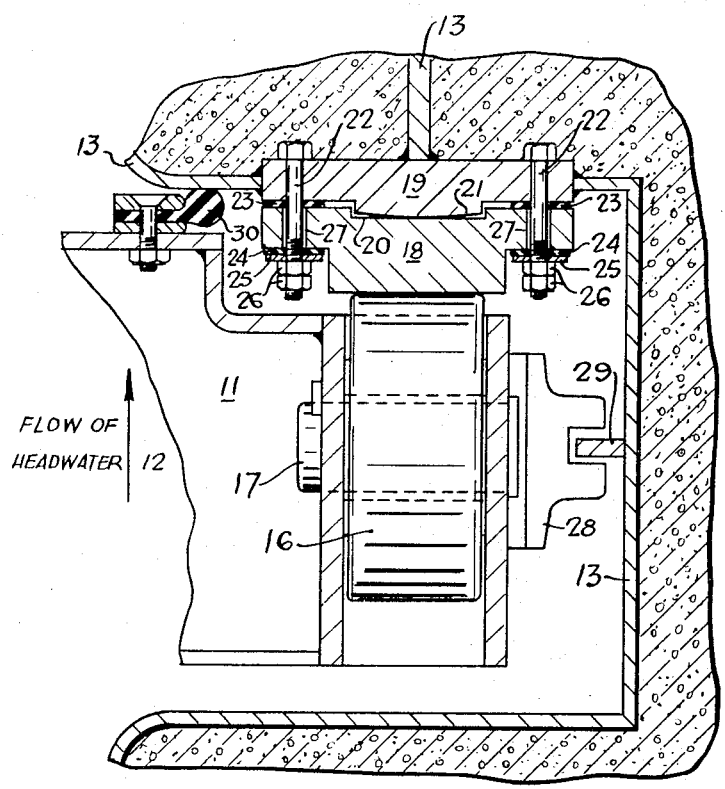
FIGURE 3 is a horizontal section, to an enlarged scale, on 3—3 in FIGURE 1.

In the following specification like numerals will refer to like parts throughout the several views. Referring now to FIGURES 1 and 2, hydraulic gate structure 11 is used for the purpose of controlling the headwater 12 and is mounted for vertical movement relative to static foundation structure 13 and is raised and lowered by means of hoist 14 and cable 15. The imposed horizontal water load on gate 11 is distributed to foundation structure 13 by a plurality of rollers 16 carried by each end assembly of gate 11.

FIGURE 3 is a horizontal section, to an enlarged scale, on 3—3 in FIGURE 1, and illustrates, at one side of the gate, the assembly of members which form the load distributing and deflection compensating roller and track system in accordance with this invention.

Typical hydraulic gate structure 11 is constructed of suitably dimensioned structural members which distribute the imposed horizontal water load to a sufficient number of rollers 16 freely rotatable on shaft and bearing means 17 carried by each end assembly of gate 11. Intermediate track member 18 is interposed between rollers 16 and bearing member 19, of static foundation structure 13, and is arranged to receive the load from rollers 16 in such a manner as to permit full use of the maximum available contact area by reason of the flat faces employed on the treads of rollers 16 and the roller path of track member 18. The load carried by track member 18 is distributed into static foundation structure 13 by the contact bearing existing between the recessed flat facing 20 on the downstream side of track member 18 and the crowned face 21 projecting from the upstream side of bearing member 19.

A plurality of bolts 22 are arranged in two vertical lines, one line being disposed on each side of the roller path of track member 18. Bolts 22 are preferably fixed to bearing member 19 by some conventional means, such as welding, or press fitting in the bolt holes.

Gaskets 23 are positioned between the vertical facing edges of track member 18 and bearing member 19 such that bolts 22 will pass therethrough. Gaskets 23 are an elastomeric material, such as synthetic rubber, and are preferably continuous along the vertical length of members 18 and 19, for the purpose of excluding foreign material from the area of the contacting faces of members 18 and 19. Gaskets 24, also of elastomeric material, such as synthetic rubber, and clamp member 25, are positioned on the upstream vertical edges of track member 18 over bolts 22. Gaskets 24 and clamp members 25 may be continuous along the vertical length of members 18 and 19 or both, or either may be in the form of an individual washer for each bolt 22. Two nuts 26 are positioned on each bolt 22, against clamp members 25, and are adjusted and locked to positively limit the rocking motion between members 18 and 19. Gaskets 23 and 24 also serve to dampen any vibrations which may occur under certain conditions of flow. The diameters of bolt holes 27, in intermediate track member 18, are dimensioned to provide permanent clearance from bolts 22.

A guide channel 28 is attached to each end assembly of gate 11 and co-operates with a guide flange 29, attached to static structure 13 adjacent each end assembly, to limit cross-stream and upstream movements of gate 11. A conventional water seal 30, made of rubber or similar material, is attached to the perimeter of gate structure 11; however, seal 30 may be attached to static foundation structure 13, either method being suitable for the purpose of sealing the clearance between gate structure 11 and foundation structure 13.

Figure 4:
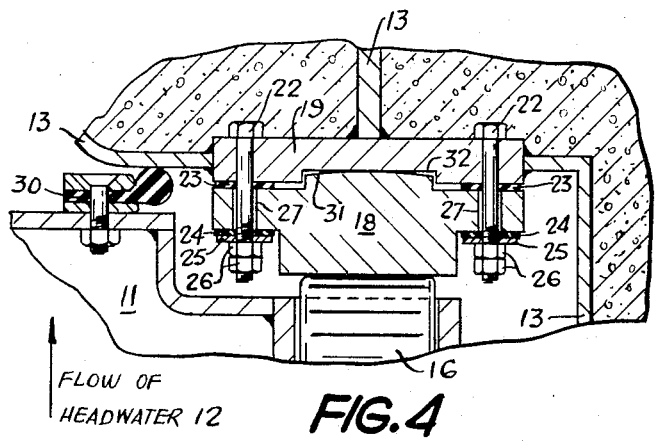
FIGURE 4 is a horizontal section, similar to FIGURE 3, but illustrating an alternative execution of this invention.

FIGURE 4 is a horizontal section, similar to FIG. 3 but illustrating an alternative execution of this invention in which the load carried by track member 18 is distributed into static foundation structure 13 by the contact bearing existing betwen the crowned face 31 projecting from the downstream side of track member 18 and the recessed flat face 32 on the upstream side of bearing member 19.

Thus, when deflection of gate structure 11, due to imposed water load, results in an angular relation between the axes of rollers 16 and the plane of bearing members 19, intermediate track members 18 will effectively rock or pivot on bearing members 19 to compensate for the angular alignments, while maintaining full face contact between the flat faced treads of rollers 16 and the flat roller paths of track members 18.

Figure 5:
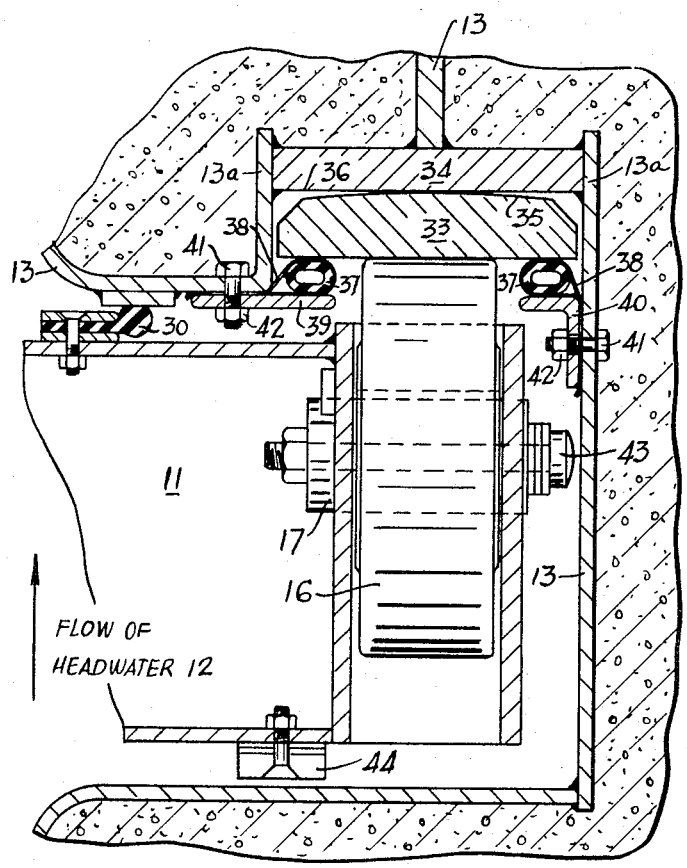
FIGURE 5 is a horizontal section, similar to FIGURE 3, but illustrating a further execution of this invention.

FIGURE 5 is a horizontal section, similar to FIG. 3 but illustrating a further execution of this invention in which intermediate track member 33 is interposed between rollers 16 and bearing member 34, of static foundation structure 13, and is arranged to receive the load from rollers 16 in such a manner as to permit full use of the maximum available contact area by reason of the flat faces employed on the treads of rollers 16 and the roller path of bearing member 34. The load carried by track member 33 is distributed into static foundation structure 13 by the contact bearing existing between the crowned face 35 on the downstream side of track member 33 and the adjacent flat face 36 on the upstream side of bearing member 34. Track member 33 is restrained from movement in a cross-stream direction by the side structure members 13a of static foundation structure 13 and is restrained from vertical movement by suitable upper and lower locating plates (not shown). Edge seals 37, composed of an elastomeric material, such as synthetic rubber, are positioned at each longitudinal upstream side of track member 33. Edge seals 37 are continuous along the length of track member 33 and are of either tubular or solid cross section. Each edge seal 37 is held in place by a plurality of light gauge anti-corrosive metal strips 38 which encircle each seal 37, and, together with seal support bar 39 and seal support member 40, are firmly clamped to static foundation structure 13 by bolts 41 and nuts 42. The positioning of seal support bar 39 and seal support member 40 provide a positive compression of edge seals 37 under all conditions of operation, and also serve to limit the upstream movement of track member 33.

Edge seals 37 also serve to exclude foreign material from the area of the contacting faces 35 and 36 and also to dampen any vibrations which may occur during operation.

Bolts 41 are preferably fixed to static foundation 13 by some conventional means, such as welding or press fitting in the bolt holes.

Guide stop members 43 are positioned at each end of gate 11 to limit the cross-stream movement theerof, and guide members 44 are positioned on the upstream edges of gate 11 to limit the upstream movement thereof. It will, of course, be understood that the guide means illustrated in FIGURE 3 could also be incorporated into this execution, or other conventional guide means, in accordance with design requirements.

A conventional water seal 30 is attached to the perimeter of gate structure 11; however, seal 30 may be attached to static foundation structure 13, either method being suitable for the purpose of sealing the clearance between gate structure 11 and foundation structure 13.

Thus, when an angular relation exists between the axes of rollers 16 and the plane of bearing members 34, due to the deflection of gate structure 11, intermediate track members 33 will effectively rock or pivot on bearing members 34 to compensate for the angular alignments, while maintaining full face contact between the flat face treads of rollers 16 and the flat roller paths of track members 33.

It will again be understood that the particular embodiments described are for purposes of illustration and should not be interpreted in a restrictive manner. For example, a further modification within the basic scope of this invention may include crowning of both contacting faces of the track members and bearing members or, in fact, any combination of surface contours which allows the track members to be in rocking contact with the bearing members and to distribute the loads therethrough to the static foundation structure.

What I claim is:

1. In a hydraulic gate or like structure including a static structure and a gate member urged towards said static structure and mounted for movement relative thereto by rollers rotatably mounted on each end of said gate member, intermediate roller track means positioned between said rollers and said static structure, the faces of said intermediate roller track means remote from said rollers being in rockable load transferring contact with said static structure to enable the treads of said rollers to maintain full face contact with the adjacent faces of said intermediate track means when said gate deflects under load.

2. A hydraulic gate or like structure as set forth in claim 1 in which at least one of said faces in load transferring rockable contact is crowned.

3. A hydraulic gate or like structure as set forth in claim 1 in which the face of said static structure, in contact with said roller track means, is crowned.

4. A hydraulic gate or like structure as set forth in claim 1 in which the face of said intermediate roller track means, in contact with said static structure, is crowned.

5. A hydraulic gate or like structure as set forth in claim 1 including stud means attached to said static structure and extending through said roller track means to limit to a small angle the rocking motion of said roller track means with respect to said static structure.

6. A hydraulic gate or like structure as set forth in claim 1 including elastomer gasket means positioned between said roller track means and said static structure.

7. In a hydraulic gate or like structure including a static structure and a gate member urged towards said static structure and mounted for movement relative thereto by rollers rotatably mounted on each end of said gate member, a bearing member fixed to said static structure in line with the rollers at each end of said gate member, said bearing members having crowned central portions projecting outwardly towards said rollers, an intermediate roller track member interposed between each bearing member and said rollers, said roller track members having flat bottom recesses engaging the crowned portions of said bearing members and permitting load transferring rocking motions between said roller track members and said bearing members to enable the treads of said rollers to maintain full face contact with the adjacent faces of said roller track members when said gate deflects under load, stud means extending outwardly from said bearing members and projecting through the adjacent roller track members and limiting to a small angle the rocking motions of said roller track members with respect to said bearing members, and elastomer gasket means disposed laterally between said roller track members and said bearing members.

8. In a hydraulic gate or like structure including a static structure and a gate member urged towards said static structure and mounted for movement relative thereto by rollers rotatably mounted on each end of said gate member, a bearing member fixed to said static structure in line with the rollers at each end of said gate member, said bearing members having flat bottom recesses extending away from said rollers, an intermediate roller track member interposed between each bearing member and said rollers, said roller track members having crowned central portions engaging the recesses in said bearing members and permitting load transferring rocking motions between said roller track members and said bearing members to enable the treads of said rollers to maintain full face contact with the adjacent faces of said roller track members when said gate deflects under load, stud means extending outwardly from said bearing members and projecting through the adjacent roller track members and limiting to a small angle the rocking motions of said roller track members with respect to said bearing members, and elastomer gasket means disposed laterally between said roller track members and said bearing members.

9. In a hydraulic gate or like structure including a static structure and a gate member urged towards said static structure and mounted for movement relative thereto by rollers rotatably mounted on each end of said gate member, a bearing member fixed to said static structure in line with the rollers at each end of said gate member, said bearing members having substantially flat surfaces facing said rollers, an intermediate roller track member interposed between each bearing member and said rollers, said roller track members having crowned surfaces engaging the substantially flat surfaces of said bearing members and permitting load transferring rocking motions between said roller track members and said bearing members to enable the treads of said rollers to maintain full face contact with the adjacent faces of said roller track members when said gate deflects under load, support members attached to said static structure and extending in spaced relation along the roller contacting faces of said roller track members, and elastomeric seal members interposed between said support members and said roller track members.

References Cited
UNITED STATES PATENTS

| | | | |
|---|---|---|---|
| 1,750,901 | 3/1930 | Newell | 61—28 |
| 2,131,052 | 9/1938 | Kinzie | 61—28 |
| 2,139,488 | 12/1938 | Cicin | 61—28 |

REINALDO P. MACHADO, *Primary Examiner.*